United States Patent

[11] 3,558,850

[72] Inventor Chester F. Leathers
  Portage, Mich.
[21] Appl. No. 744,154
[22] Filed July 11, 1968
[45] Patented Jan. 26, 1971
[73] Assignee Cal Manufacturing Company, Incorporated
  Portage, Mich.
  a corporation of Michigan

[54] WELDING SYSTEM WITH AUTOTRANSFORMER BETWEEN CABLE AND GUN
  6 Claims, 4 Drawing Figs.
[52] U.S. Cl. ............................................ 219/116, 336/148
[51] Int. Cl. .................................................. B23k 11/24, H01h 71/28
[50] Field of Search ...................................... 219/116, 90, 78, 86; 336/107, 148

[56] References Cited
UNITED STATES PATENTS
1,645,705  10/1927  Ledwinka ........................ 219/89
2,465,879  3/1949  Kauder ........................... 219/90
3,320,400  5/1967  Leathers .......................... 219/89

Primary Examiner—J. V. Truhe
Assistant Examiner—Hugh D. Jaeger
Attorney—Woodhams, Blanchard and Flynn ABSTRACT: An electric welding device having a pair of relatively removable electrodes and autotransformer means releasably connected in circuit with said electrodes for reducing the voltage across said electrodes. Said autotransformer means includes housing means having first and second nonaligned exterior surfaces, said first surface having a pair of spaced-apart lugs thereon and said second surface having a single lug having a thickness equal to the spacing between said pair of lugs on said first surface.

The autotransformer windings are constructed so that a solid metal connection is provided between the lugs, which connection constitutes the primary winding conductors. The secondary winding conductors are interdigitated with said primary winding conductors.

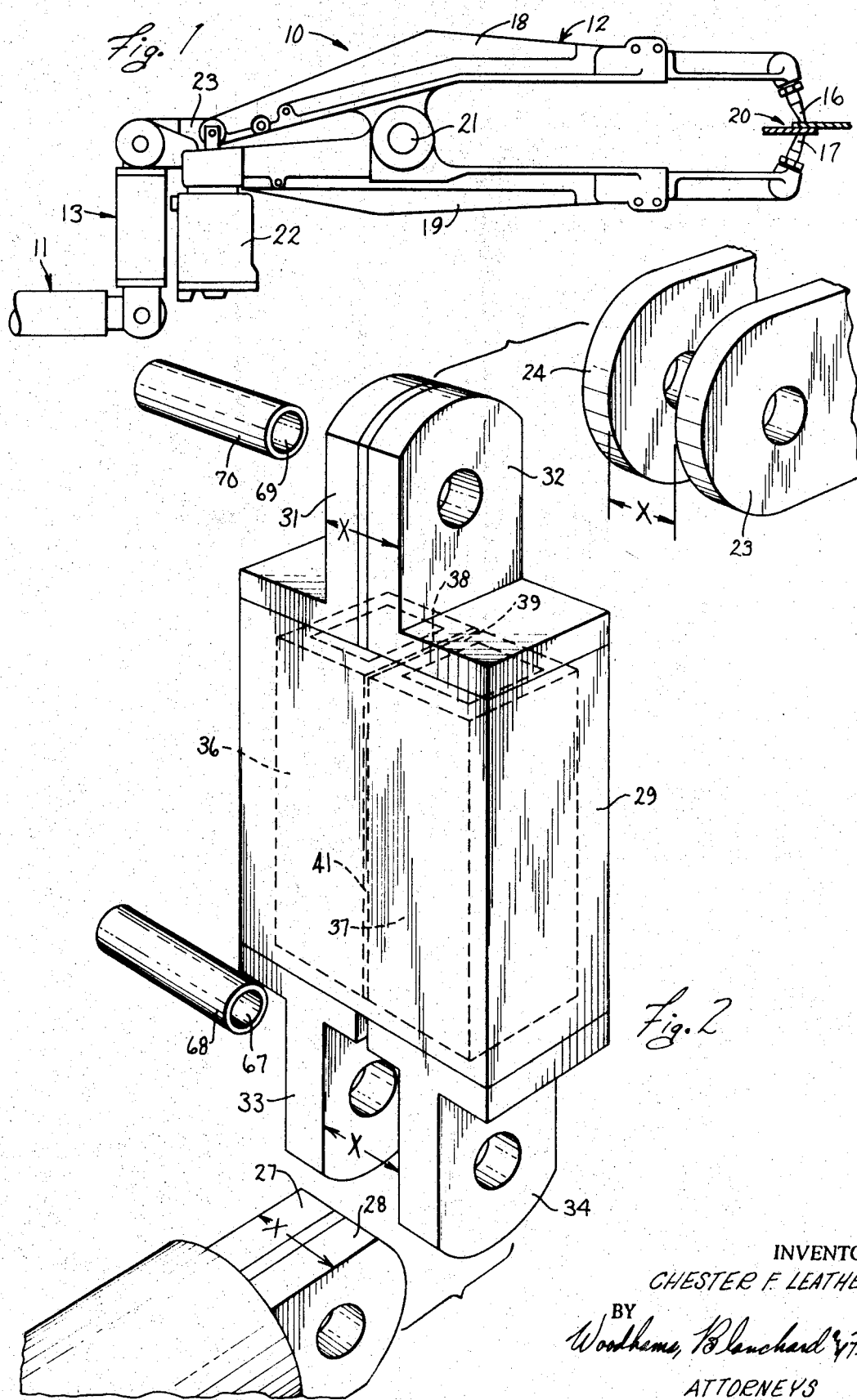

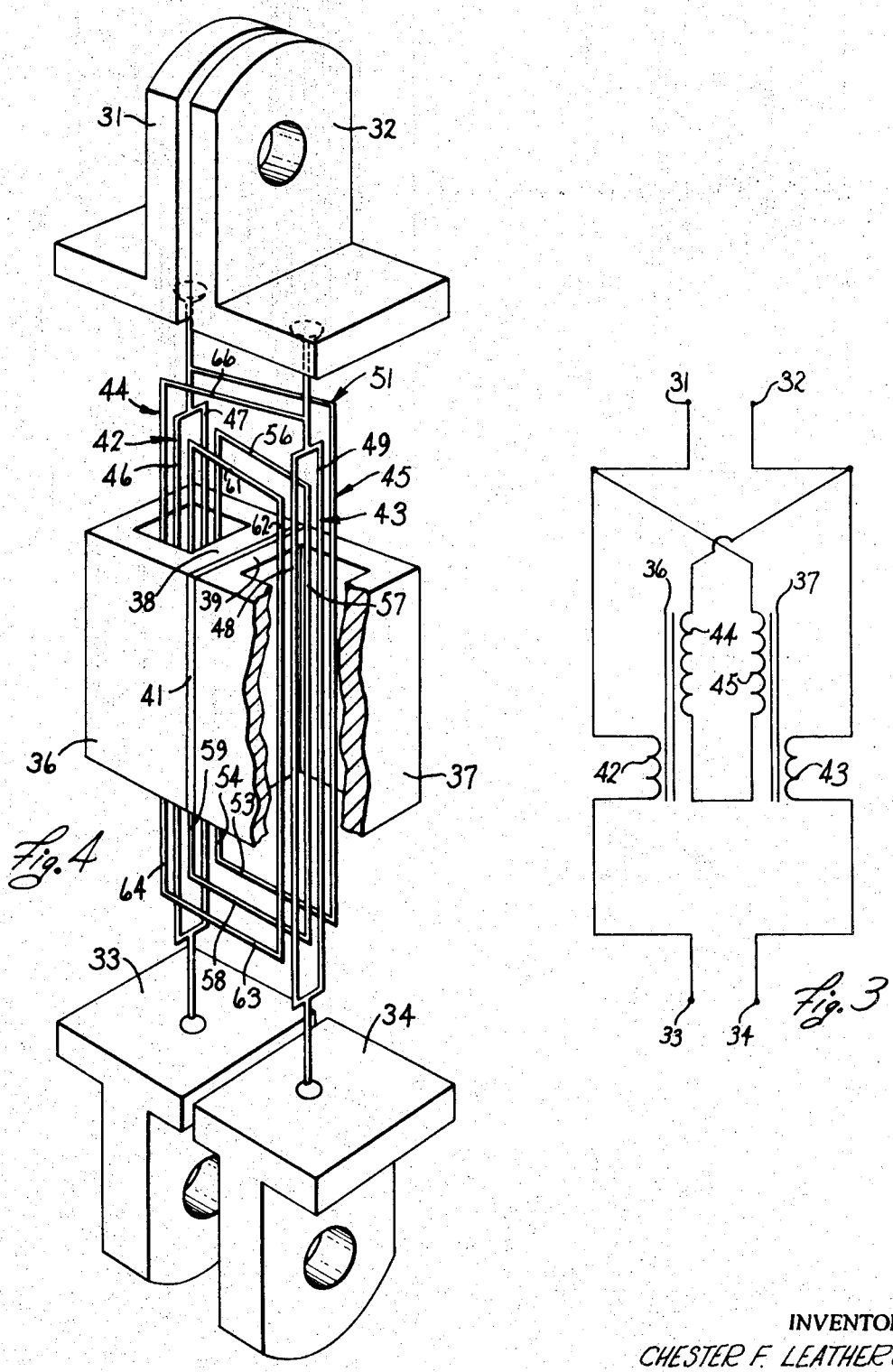

WELDING SYSTEM WITH AUTOTRANSFORMER BETWEEN CABLE AND GUN

FIELD OF THE INVENTION

This invention relates in general to a portable electric welding apparatus and, more particularly, to a type thereof having an auto transformer releasably connectable thereto.

DESCRIPTION OF THE PRIOR ART

Persons familiar with the use and operation of portable electric welding devices, such as welding guns commonly used in the assembly of automobile bodies, have long been aware of the need for improvement in these welding devices. One such improvement is disclosed in my U.S. Pat. No. 3,320,400 issued May 16, 1967.

Existing electric welders of the portable gun-type are often constructed to serve a specific welding need. That is, the jaws that support the welding electrodes are designed and constructed so that they will fit around or through or into a certain part of the structure, such as an automobile body, being welded thereby. Thus, the welding jaws are often changed or replaced with change in the body style and it is obviously desirable to minimize the cost resulting from this change.

Known types of structures wherein the auto transformer is located between the welding cable and welding gun require a great deal of manual dexterity by the operator to change welding guns. That is, when the gun is disconnected from the auto transformer the welding cable also becomes disconnected. Thus, it has proven to be a very time-consuming task to bring together three elements, namely the welding cable, welding gun and the auto transformer every time the welding gun is changed.

Furthermore, an increase in the cost of electrical conductor material, namely copper, has made it necessary to devise other types of auto transformer structures which would result in a savings in the amount of electrical conductor materials used therein. The criteria for such further development is governed by optimizing the size or cross section of the conductors and the heat levels generated by the loads carried through the conductors. Thus, the known auto transformer designs which are small and compact are complicated and heavy especially where small conductors are used for carrying high loads and cooling apparatus is utilized to prevent heat damage to the transformer. In the portable-type electric welders referred to above, such added weight to the auto transformer is undesirable since the added weight adds to the difficulty of manipulating the welding guns.

Accordingly, the objects and purposes of this invention have been:

1. To provide a portable welding apparatus which is capable of developing voltage and amperage across its welding electrodes substantially identical to those developed by previously existing welding devices without appreciably increasing the weight of the welding device, but while decreasing substantially the size, weight, rigidity and cost of the cable connecting the welding device to the primary source of energy.

2. To provide apparatus, as aforesaid, which includes an auto transformer separably attached to the welding gun and arranged for connection to the welding cable by substantially the same type of means as that provided for connecting the auto transformer to the welding gun.

3. To provide apparatus, as aforesaid, in which the conductors utilize a minimum of copper for a given capacity thereby resulting in a lightweight auto transformer construction.

4. To provide apparatus, as aforesaid, wherein the welding gun and the welding cable are secured to the auto transformer housing at opposite ends thereof and utilize the electrical conductors to stiffen the connection between the gun and the cable through the auto transformer to withstand sideward movements thereof.

5. To provide apparatus, as aforesaid, wherein the auto transformer is relatively light in weight, capable of continuous operation under a relatively heavy load by comparison to such weight and which can be mounted upon the welding gun so that it does not interfere in any way with the normal operation thereof.

Other objects and purposes of this invention will be apparent to persons familiar with portable welding devices upon reading the following specification and examining the accompanying drawings.

BRIEF DESCRIPTION OF THE DRAWINGS

FIG. 1 is a side view of a welding gun in association with a standard welding cable and an auto transformer of the type embodying the invention.

FIG. 2 is an exploded perspective view of the auto transformer in association with the welding cable and welding gun.

FIG. 3 is an electrical schematic of the auto transformer.

FIG. 4 is a schematical representation of the primary and secondary windings around the cores of the auto transformer.

Certain terminology will be used in the following description for convenience and reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the invention, including those set forth above, have been met by recognizing that the usual welding gun has a pair of terminals which are normally fixedly spaced from each other, but which may be movable with respect to each other. The usual welding cable is provided with a pair of terminals rigidly related to each other, but insulated from each other which cable terminals are insertable between said welding gun terminals. The auto transformer of the invention is provided with four terminals in which a first and second thereof are positioned close to but insulated from each other at one end of the auto transformer housing and the third and fourth thereof are fixedly spaced from each other a distance equal to the thickness of the first and second terminals at the other end of the housing.

Furthermore, the auto transformer windings are constructed so that a solid metal connection is provided between the lugs, which connection constitutes the primary winding conductors thereby eliminating the need for additional stiffening members which merely add to the weight of the apparatus.

DETAILED DESCRIPTION

The electrical welding device 10 (FIG. 1) comprises a standard welding cable 11, a welding gun 12 and an auto transformer 13 connected therebetween. The welding gun 12 comprises welding electrodes 16 and 17 mounted in a conventional manner on arms 18 and 19 which are pivoted together at 21 and are provided with conventional means 22, such as a piston and cylinder arrangement, for mechanically moving said welding electrodes 16 and 17 toward and away from each other as desired for placement on opposite sides of pieces of metal 20 to be joined together. A pair of terminals, here supply lugs 23 and 24, project from the frame of the portable welding device 12 and are electrically connected in any convenient manner with the welding electrodes 16 and 17.

The welding cable 11 of any convenient type, such as those shown in my U.S. Pat. Nos. 2,943,133 and 3,163,704, is provided with a pair of output terminals, here output lugs 27 and 28, which are rigidly connected with respect to each other in side-by-side relation, but which are insulated from each other for the usual purposes. The space between the opposing surfaces of the supply lugs 23 and 24 is substantially the same as the combined thickness (FIG. 2) of the output lugs 27 and 28 so that said lugs 27 and 28 can fit snugly between the lugs 23 and 24 and have a good electrical contact therewith.

The auto transformer 13 comprises an elongated hollow housing 29 which has a pair of output terminals, here output lugs 31 and 32 rigidly connected with respect to each other in side-by-side relation, but which are insulated from each other, secured to one end of the housing by any convenient means not shown. A pair of input terminals, here input lugs 33 and 34 are connected to the other end of the elongated hollow housing 29 and spaced apart so that the distance between opposing surfaces of the input lugs 33 and 34 is substantially the same as the combined thickness of the output lugs 31 and 32 or a dimension "X" illustrated in FIG. 2.

A pair of elongated rectangular tubular cores 36 and 37 are housed within the housing 29 between the end terminal lugs 31, 32 and 33, 34. In this particular embodiment, the walls 38 and 39 of the cores 36 and 37, respectively, are separated by insulation 41. Furthermore, the exterior surfaces of the cores 36 and 37 are spaced from the interior surfaces of the housing 29 thereby providing a suitable structure for permitting water cooling, if necessary.

Referring to the electrical schematic of FIG. 3, the lug or terminal 33 is series connected to the lug or terminal 31 through the primary winding 42. The lug or terminal 34 is series-connected to the lug or terminal 32 through the primary winding 43. Terminal 31 is series-connected to the terminal 32 through the secondary windings 44 and 45.

More particularly, and referring to FIG. 4 illustrating schematically the mechanical windings, the primary winding 42 comprises a set of parallel-connected conductors 46 and 47 extending through the center of the core 36. The primary winding 43 comprises a set of parallel-connected conductors 48 and 49 extending through the center of the core 37. Both of the windings 42 and 43 are rather thick and the straight through construction is sturdy enough so that a solid metal connection (illustrated schematically in FIG. 4) is formed between the lugs 31, 32 and 33, 34. This solid connection permits the housing structure 29 to be of a reduced strength since some of the forces tending to bend and twist the unit will be resisted by the solid metal connection.

The secondary windings 44 and 45 comprise three turns of a conductor 51. That is, one end of the conductor 51 is secured to the terminal 31 and extends through the center of the core 37 parallel to and closely adjacent the conductor 49 of the primary winding 43. The lower end of the conductor 51 is joined to section 53 which in turn is joined to a section 54 which passes upwardly through the center of the core 36 parallel to and closely adjacent the conductor 47 of the primary winding 42. A section 56 is joined at one end to the upper end of the section 54 which in turn is connected to a section 57 which extends downwardly through the center of the core 37 between the conductors 48 and 49 of the primary winding 53. A section 58 interconnects the lower end of the section 57 with a section 59 which extends upwardly through the center of the core 36 between the conductors 46 and 47 of the primary winding 42. A section 61 interconnects the upper end of the section 59 and a section 62 which extends downwardly through the center of the core 37 parallel to and closely adjacent the conductor 48 of the primary winding 43. A section 63 interconnects the lower portion of the section 62 with a section 64 which passes upwardly through the center of the core 36 parallel to and closely adjacent the conductor 46 of the primary winding 42 and in turn is connected by a section 66 to the terminal 32.

Thus, there is one electrical turn and two mechanical turns, in the primary windings 42 and 43. There are three electrical turns and three mechanical turns in the secondary windings 44 and 45. The interdigitation of the conductors 46, 47 and 48, 49 between the conductor segments 54, 59, 64 and 51, 57, 62, respectively prevents development of forces due to the flux generated by the passage of current therethrough from separating the conductors and warping the transformer housing.

A pin 67 and an insulating sleeve 68 therefor extend through the lugs 23, 24 and 31, 32 to fasten same together in the relationship above described but permits the usual desired relative pivotal movement between the welding gun 12 and the auto transformer 13 connected thereto. A pin 69 and an insulating sleeve 70 therefor extend through the lugs 27, 28 and 33, 34 to fasten same together in the relationship above described, but permits the usual desired relative pivotal movement between the cable 11 and the auto transformer 13.

When the welding cable is supplied with low voltage, high current electrical energy and the welding electrodes 16 and 17 are positioned for completing a welding operation, a primary current will flow from the source through the conductors 46 and 47, the pieces of metal to be joined and the conductors 48 and 49 back to the source. This flow of current will be sufficient to cause an induced current in the secondary winding 44. In this particular embodiment, the current transformation is three. That is, the current generated in the secondary winding is three times greater than the current in the primary winding. Thus, a satisfactory weld has been observed through the use of the structure set forth above.

Although a particular preferred embodiment of the invention has been disclosed above for illustrative purposes, it will be understood that variations or modifications thereof which lie within the scope of the appended claims are fully contemplated.

I claim:

1. In an electric welding device having a pair of relatively movable electrodes, the combination comprising:
   support means movably relating said electrodes with respect to each other and having first electrical connecting means electrically connected to said electrodes;
   flexible conductor means having second electrical connecting means thereon;
   auto transformer means separable from said first electrical connecting means and said electrodes and connected in circuit with said electrodes and said second electrical connecting means for reducing the voltage across said electrodes and including housing means having at least first and second nonaligned surfaces, said first surface having first and second spaced-apart lugs secured thereto and said second surface having third and fourth lugs in side-by-side relation and insulated from each other and having a thickness equal to the spacing between said first and second lugs; and
   whereby said third and fourth lugs are releasably connected to said first electrical connector means and said first and second lugs are releasably connected to said second electrical connector means.

2. The auto transformer defined in claim 1, wherein said first electrical connector means includes fifth and sixth spaced-apart lugs; and wherein said second electrical connector means includes seventh and eighth lugs connected in side-by-side relation and insulated from each other and having a thickness equal to the spacing between said first and second lugs.

3. The auto transformer defined in claim 2, wherein said first and second lugs and said third and fourth lugs are secured to opposite ends of said housing.

4. An auto transformer unit adapted to be connected between a welding cable and a welding gun, said welding gun utilizable for welding pieces of metal together, comprising:
   a housing having first and second terminal means at one location and third and fourth terminal means at another location thereon;
   first and second elongated tubular core means in said housing;
   first primary conductor means connected between said first and third terminal means and extending through the center of said first core means;

second primary conductor means connected between said second and fourth terminal means and extending through the center of said second core means;

secondary conductor means wound a predetermined number of turns through the centers of said first and second cores and is electrically connected at one end to said first terminal means and electrically connected at the other end to said second terminal means; and whereby energization of said welding cable will cause the flow of primary current from said welding cable through said first primary conductor means, said pieces of metal to be welded together, said second primary conductor means and back to said welding cable and cause a current to be induced in said secondary conductor means which is additive to said primary current flowing through said pieces of metal to be welded together to thereby form a weld joint.

5. An auto transformer unit defined in claim 4, wherein said first and second primary conductor means each include a pair of parallel connected conductor means; and wherein said turns of said secondary conductor means comprises three turns interdigitated with said first and second primary conductor means.

6. An auto transformer unit defined in claim 4, wherein said first conductor means is a rigid bar which is secured to and extends between said first and third terminal means; and wherein said second conductor means is a rigid bar which is secured to and extends between said second and fourth terminal means;

whereby a solid metal connection is formed between said respective terminal means thereby increasing the mechanical resistance of said auto transformer unit to sidewise movements.